(12) United States Patent
Mori

(10) Patent No.: US 10,866,390 B2
(45) Date of Patent: Dec. 15, 2020

(54) OPTICAL SYSTEM AND IMAGING APPARATUS HAVING THE SAME

(71) Applicant: CANON KABUSHIKI KAISHA, Tokyo (JP)

(72) Inventor: Kentaro Mori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 16/277,834

(22) Filed: Feb. 15, 2019

(65) Prior Publication Data
US 2019/0265439 A1 Aug. 29, 2019

(30) Foreign Application Priority Data
Feb. 28, 2018 (JP) ................................ 2018-035315

(51) Int. Cl.
| | | |
|---|---|---|
| *G02B 13/18* | (2006.01) | |
| *G02B 9/64* | (2006.01) | |
| *G02B 9/10* | (2006.01) | |
| *G02B 9/04* | (2006.01) | |
| *G02B 5/00* | (2006.01) | |
| *G02B 13/00* | (2006.01) | |

(52) U.S. Cl.
CPC ............ *G02B 9/64* (2013.01); *G02B 13/18* (2013.01); *G02B 5/005* (2013.01); *G02B 9/04* (2013.01); *G02B 9/10* (2013.01); *G02B 13/006* (2013.01); *G02B 13/0045* (2013.01)

(58) Field of Classification Search
CPC ...... G02B 13/0045; G02B 13/18; G02B 9/10; G02B 5/005; G02B 13/006; G02B 9/04; G02B 9/64

USPC ......................................... 359/717, 740, 795
See application file for complete search history.

(56) References Cited

U.S. PATENT DOCUMENTS

| | | | | |
|---|---|---|---|---|
| 4,494,829 A | * | 1/1985 | Aklin ..................... | G02B 13/00 359/648 |
| 5,029,994 A | * | 7/1991 | Aoki ...................... | G02B 13/02 359/653 |
| 2009/0273851 A1 | * | 11/2009 | Take .................... | G02B 15/163 359/755 |
| 2011/0299179 A1 | * | 12/2011 | Maetaki ............... | H04N 5/2254 359/754 |
| 2014/0247506 A1 | * | 9/2014 | Ori ........................ | G02B 13/02 359/708 |
| 2015/0160443 A1 | * | 6/2015 | Kanda .................. | G02B 15/142 359/691 |

(Continued)

FOREIGN PATENT DOCUMENTS

JP 2014-81429 A 5/2014

*Primary Examiner* — Evelyn A Lester
(74) *Attorney, Agent, or Firm* — Canon U.S.A., Inc. IP Division

(57) ABSTRACT

An optical system includes a first lens unit having positive refractive power, and a second lens unit. The first lens unit includes, in order from an object side to an image side, a positive lens, a positive lens, a positive lens, a negative meniscus lens having a concave surface on the image side, a diaphragm SP, and at least one lens. The second lens unit includes a positive lens and a negative lens. At the time of focusing from infinity to close range, the first lens unit moves to the object side to change a distance on the optical axis between the first lens unit and the second lens unit. The optical system satisfies predetermined conditional expressions.

15 Claims, 13 Drawing Sheets

(56) References Cited

U.S. PATENT DOCUMENTS

| | | | |
|---|---|---|---|
| 2015/0168678 A1* | 6/2015 | Baba | G02B 9/62 |
| | | | 359/754 |
| 2015/0293327 A1* | 10/2015 | Tomioka | G02B 13/02 |
| | | | 359/754 |
| 2017/0176725 A1* | 6/2017 | Machida | G02B 13/02 |
| 2017/0242219 A1* | 8/2017 | Kondo | G02B 7/10 |
| 2018/0275380 A1* | 9/2018 | Sudoh | G02B 15/142 |

* cited by examiner

OPTICAL SYSTEM AND IMAGING APPARATUS HAVING THE SAME

BACKGROUND

Field of the Disclosure

The present disclosure relates to an optical system, and is suitable for use in digital video cameras, digital still cameras, broadcasting cameras, silver-halide film cameras, monitoring cameras, and the like.

Description of the Related Art

In a Gaussian optical system where lenses are arranged substantially symmetrically with respect to an aperture stop, aberrations resulting from the asymmetry property of the optical system, such as coma aberration, distortion, and chromatic aberration of magnification, can be reduced.

Japanese Patent Laid-Open No. 2014-81429 discloses a large aperture medium telephoto Gaussian optical system including a first lens unit having positive refractive power and a second lens unit having positive refractive power, which are arranged in the order from an object side to an image side.

SUMMARY

An object of the present disclosure is to provide a small optical system with high image quality.

An optical system includes a first lens unit and a second lens unit arranged in order from an object side to an image side, the first lens unit having a positive refractive power. The first lens unit includes a positive lens L11, a positive lens L12, a positive lens L13, a negative meniscus lens L14 having a concave surface on the image side, a diaphragm, and at least one lens, in order from the object side to the image side. The second lens unit includes a positive lens and a negative lens. Upon focusing from infinity to close range, the first lens unit moves to the object side to change a distance on an optical axis between the first lens unit and the second lens unit. The following conditional expression is satisfied:

$$1.1 < D2/BF < 2.5$$

where D2 is a distance on the optical axis from a surface closest to the object side to a surface closest to the image side in the second lens unit, and BF is back focus of the optical system.

An imaging apparatus includes: an optical system; and an image pickup device configured to receive light of an image formed by the optical system. The optical system includes a first lens unit and a second lens unit arranged in order from an object side to an image side, the first lens unit having a positive refractive power. The first lens unit includes a positive lens L11, a positive lens L12, a positive lens L13, a negative meniscus lens L14 having a concave surface on the image side, a diaphragm, and at least one lens, in order from the object side to the image side. The second lens unit includes a positive lens and a negative lens. Upon focusing from infinity to close range, the first lens unit moves to the object side to change a distance on an optical axis between the first lens unit and the second lens unit. The following conditional expression is satisfied:

$$1.1 < D2/BF < 2.5$$

where D2 is a distance on the optical axis from a surface closest to the object side to a surface closest to the image side in the second lens unit, and BF is back focus of the optical system.

Further features of the present invention will become apparent from the following description of exemplary embodiments (with reference to the attached drawings).

DESCRIPTION OF THE EMBODIMENTS

Figure 1:
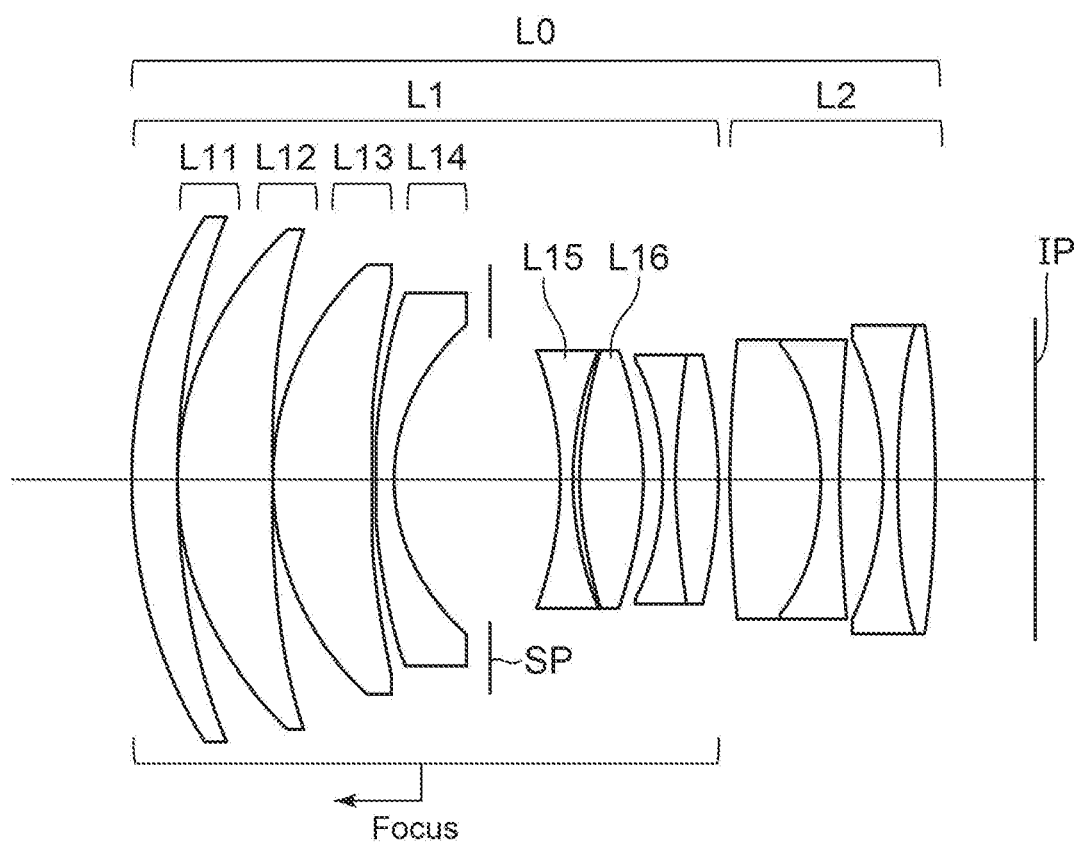
FIG. 1 is a cross-sectional view of an optical system of a first embodiment.
Figure 2:
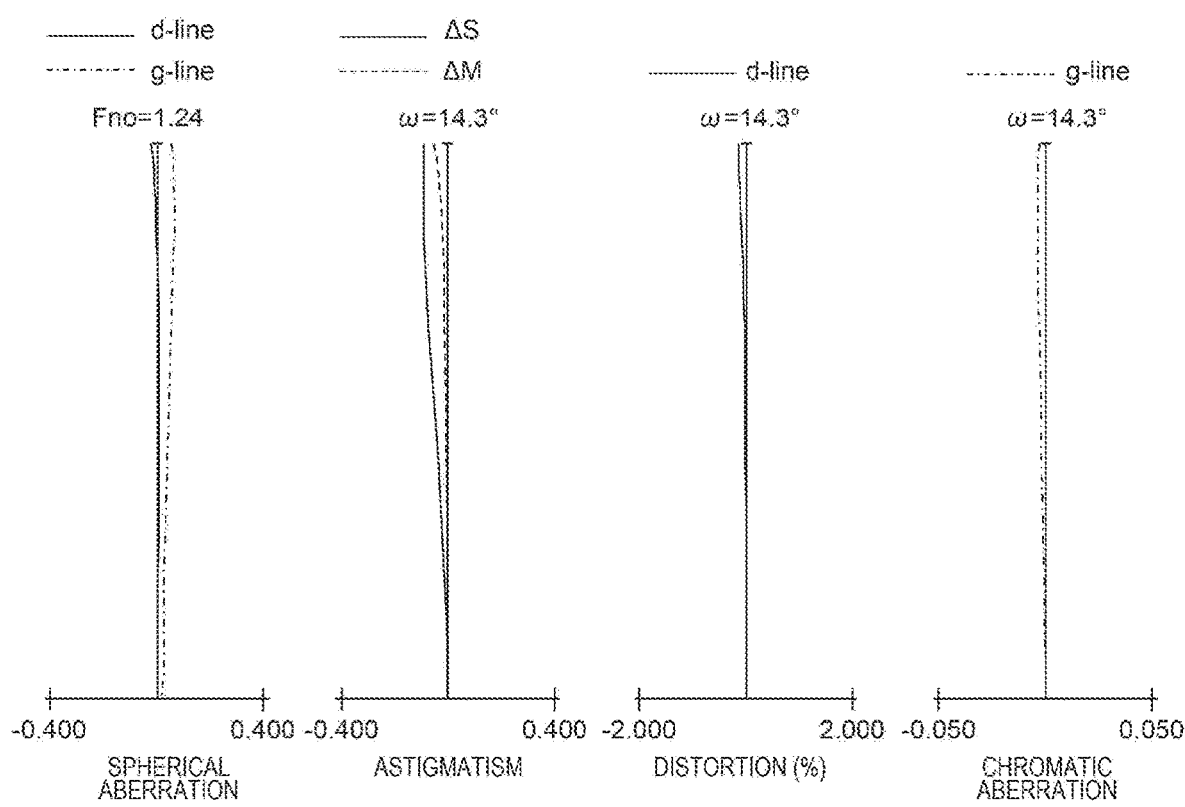
FIG. 2 is an aberration diagram of the optical system of the first embodiment.
Figure 3:
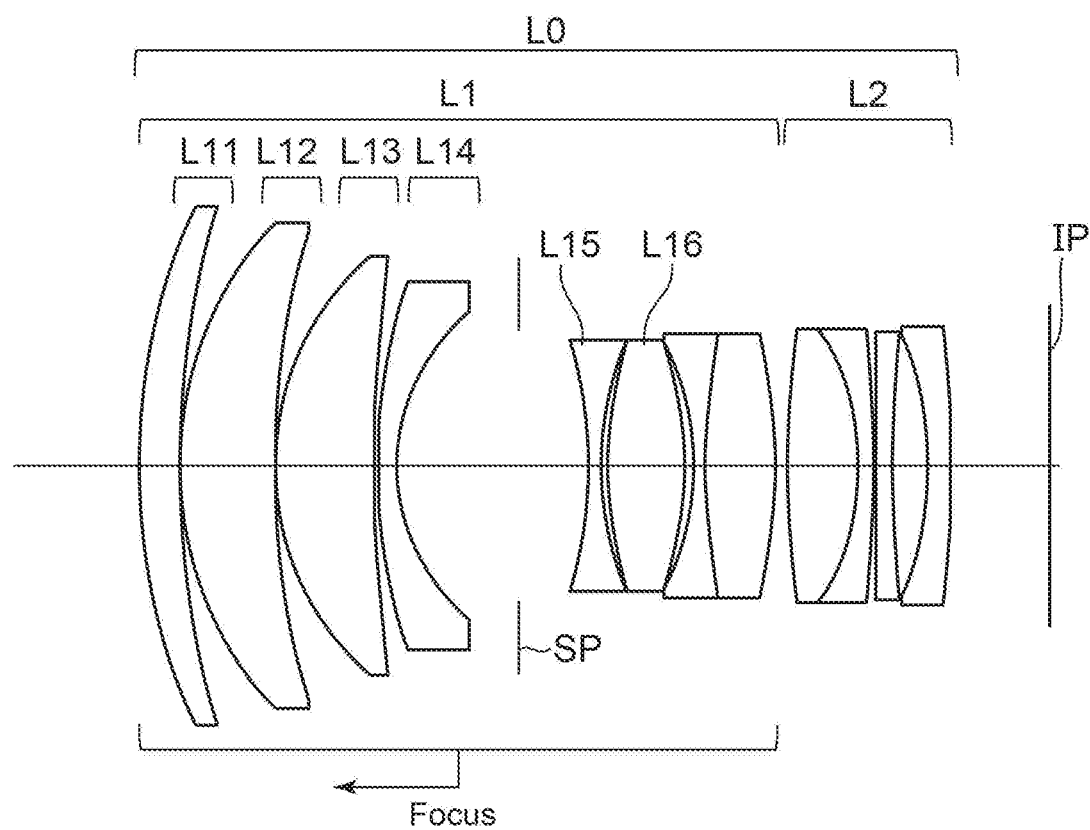
FIG. 3 is a cross-sectional view of an optical system of a second embodiment.
Figure 4:
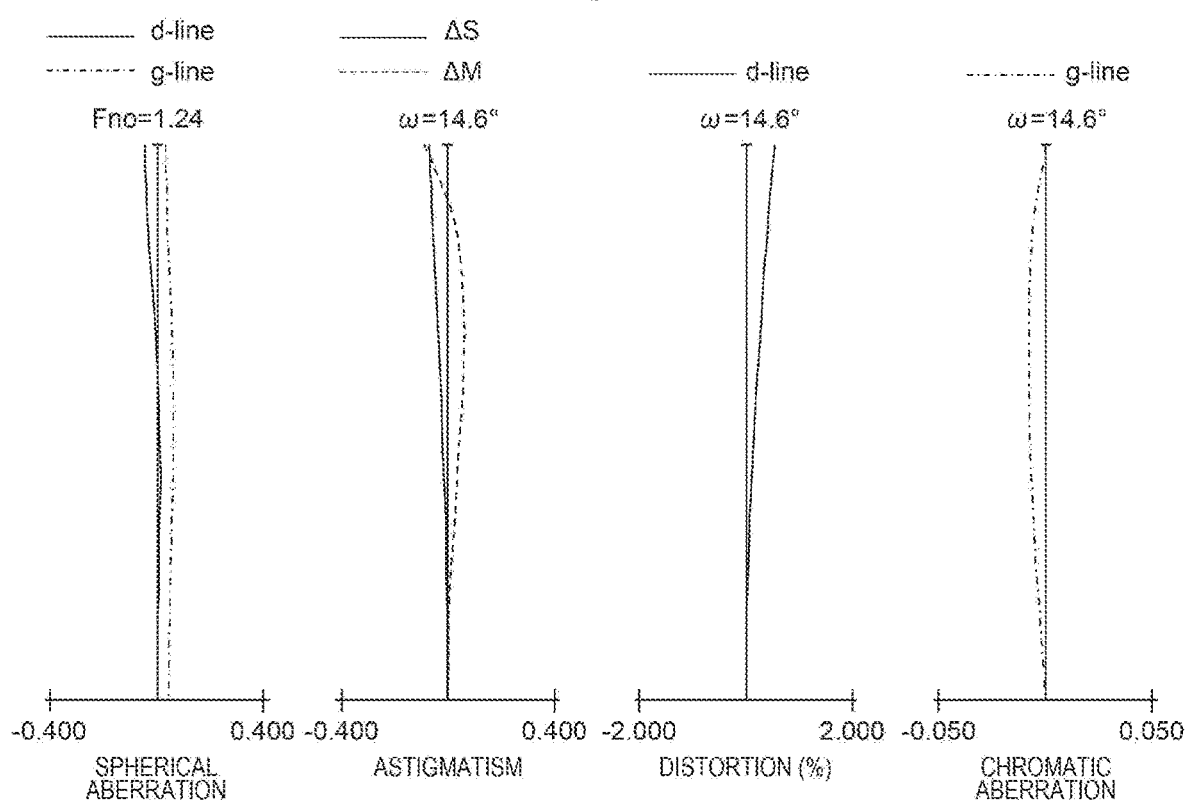
FIG. 4 is an aberration diagram of the optical system of the second embodiment.
Figure 5:
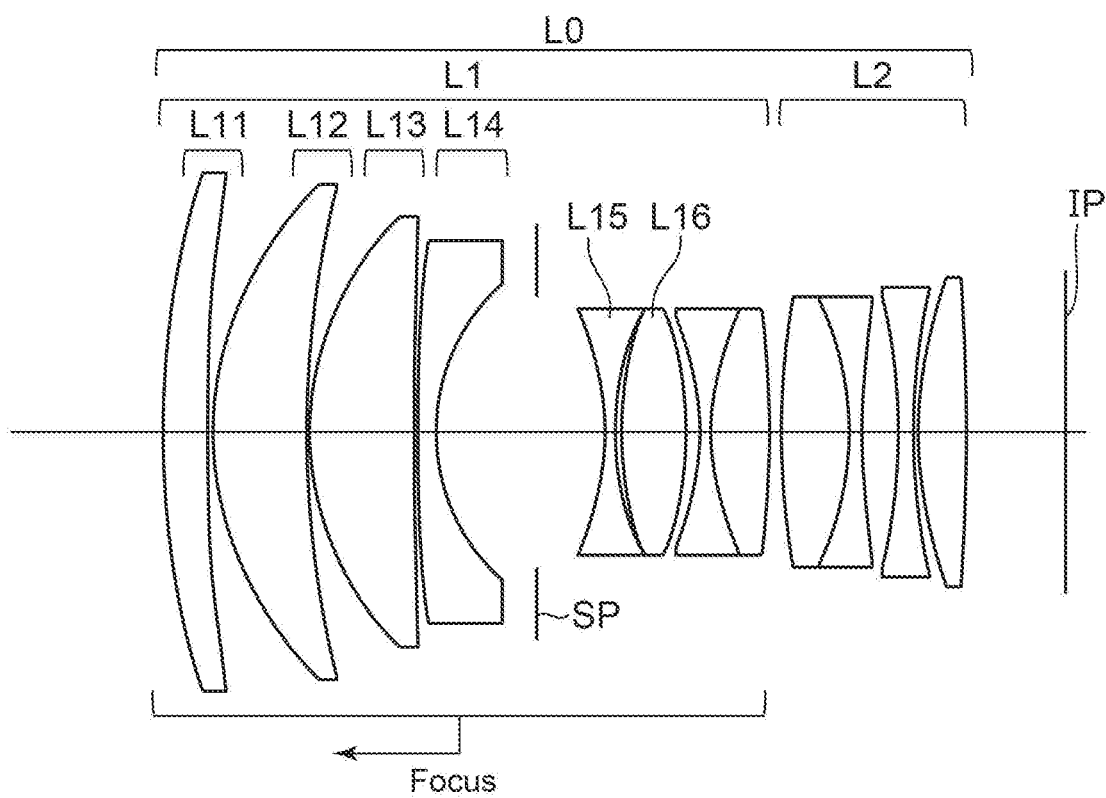
FIG. 5 is a cross-sectional view of an optical system of a third embodiment.
Figure 6:
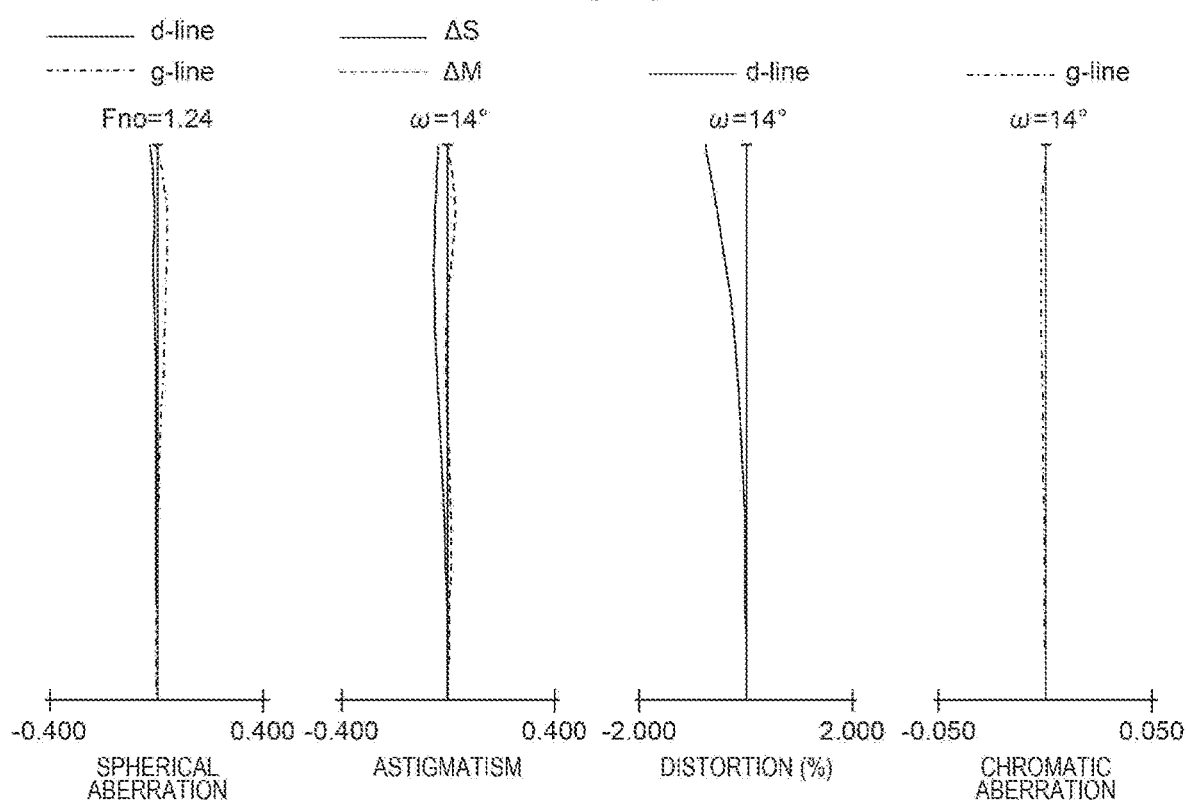
FIG. 6 is an aberration diagram of the optical system of the third embodiment.
Figure 7:
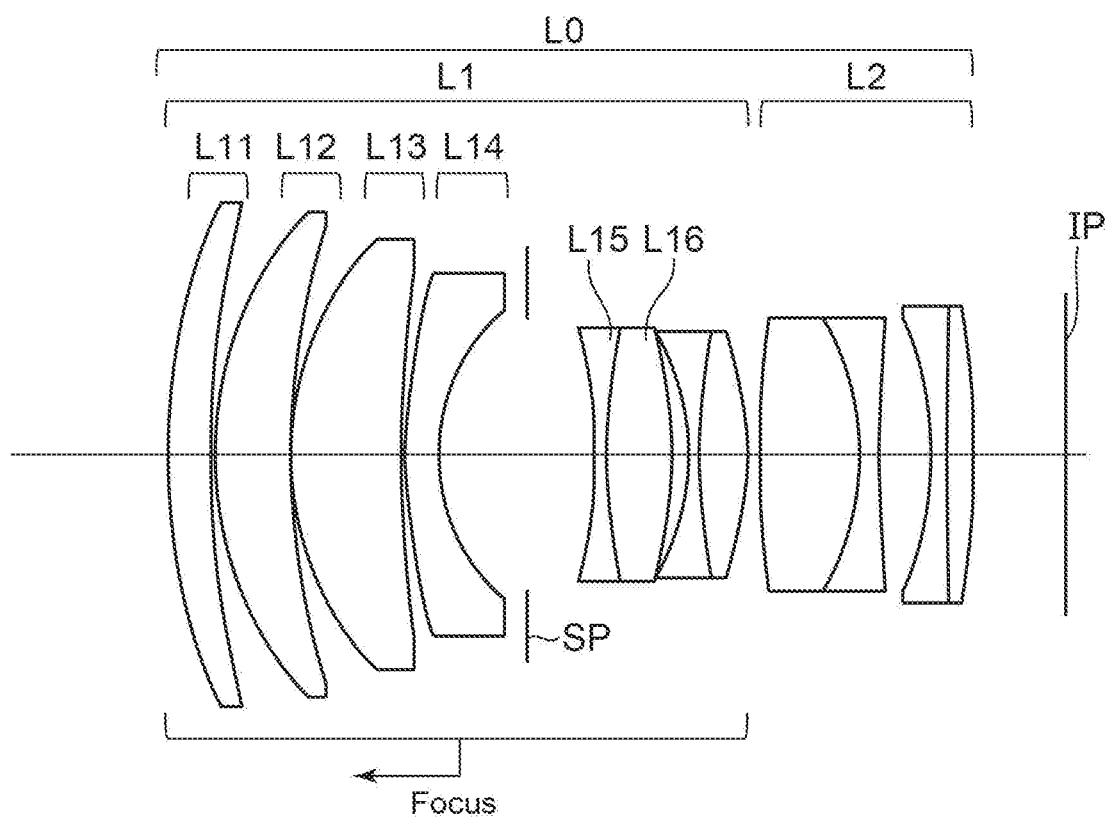
FIG. 7 is a cross-sectional view of an optical system of a fourth embodiment.
Figure 8:
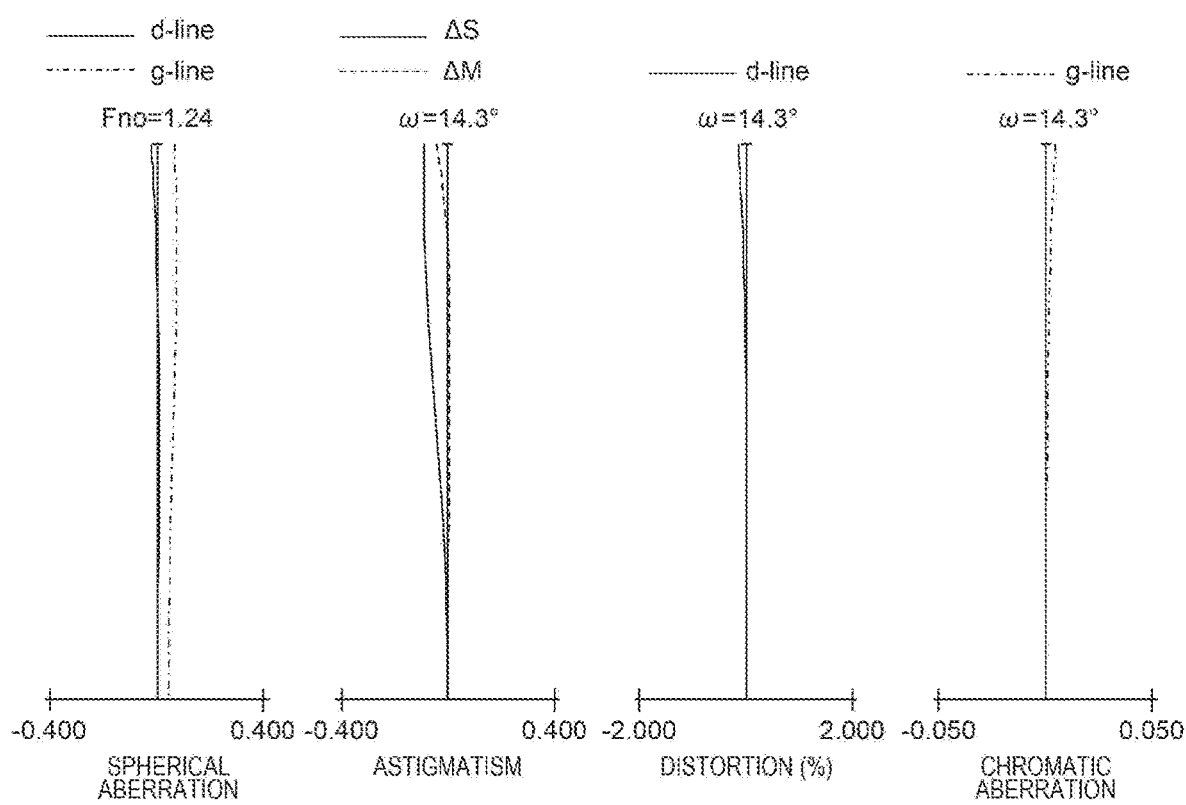
FIG. 8 is an aberration diagram of the optical system of the fourth embodiment.
Figure 9:
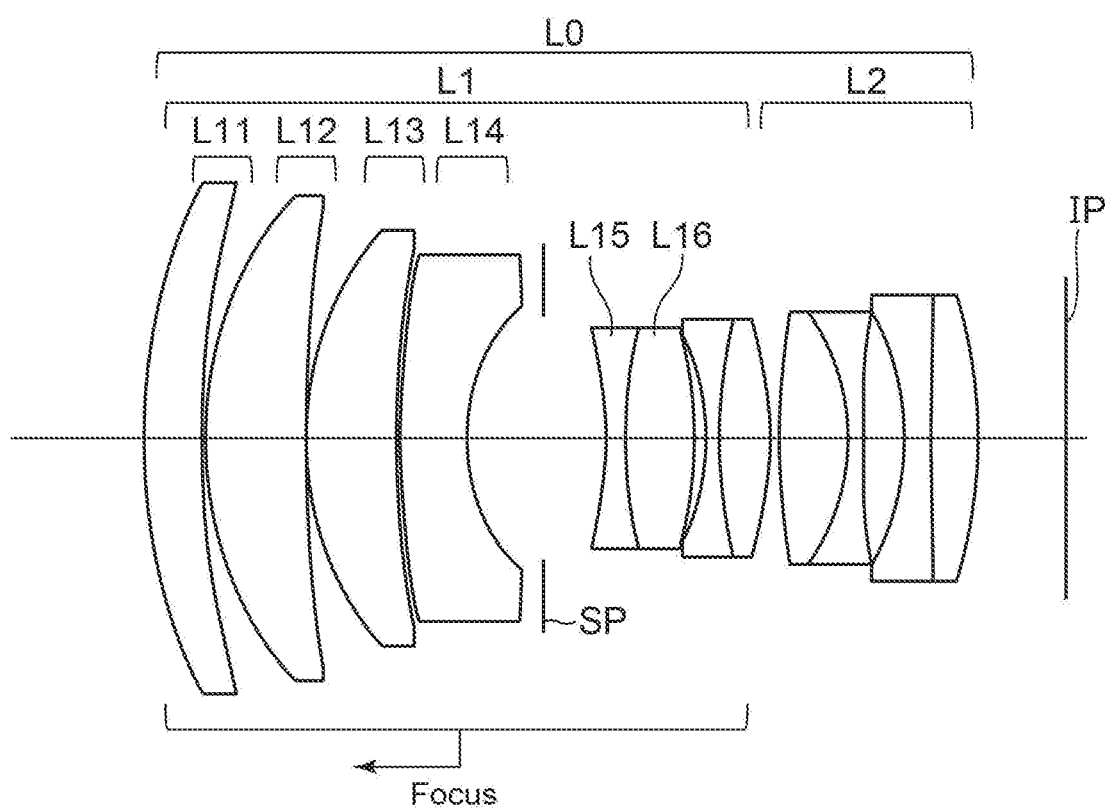
FIG. 9 is a cross-sectional view of an optical system of a fifth embodiment.
Figure 10:
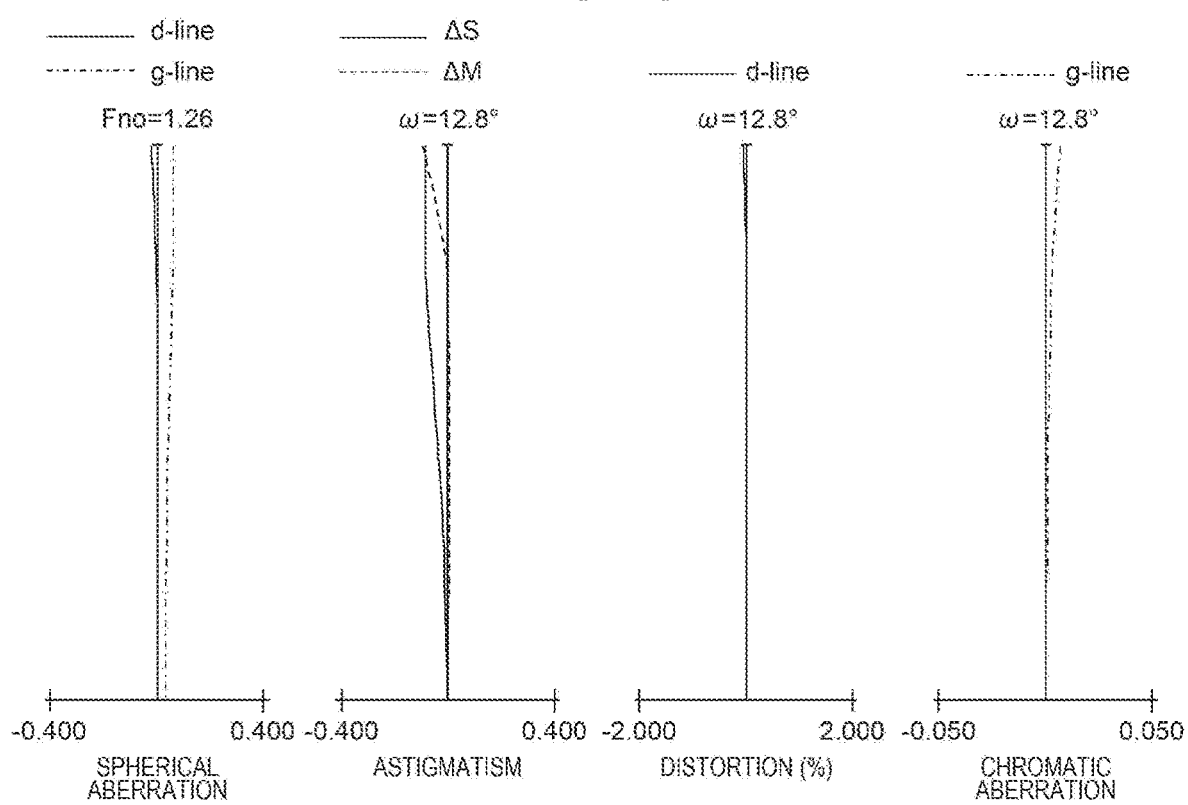
FIG. 10 is an aberration diagram of the optical system of the fifth embodiment.
Figure 11:
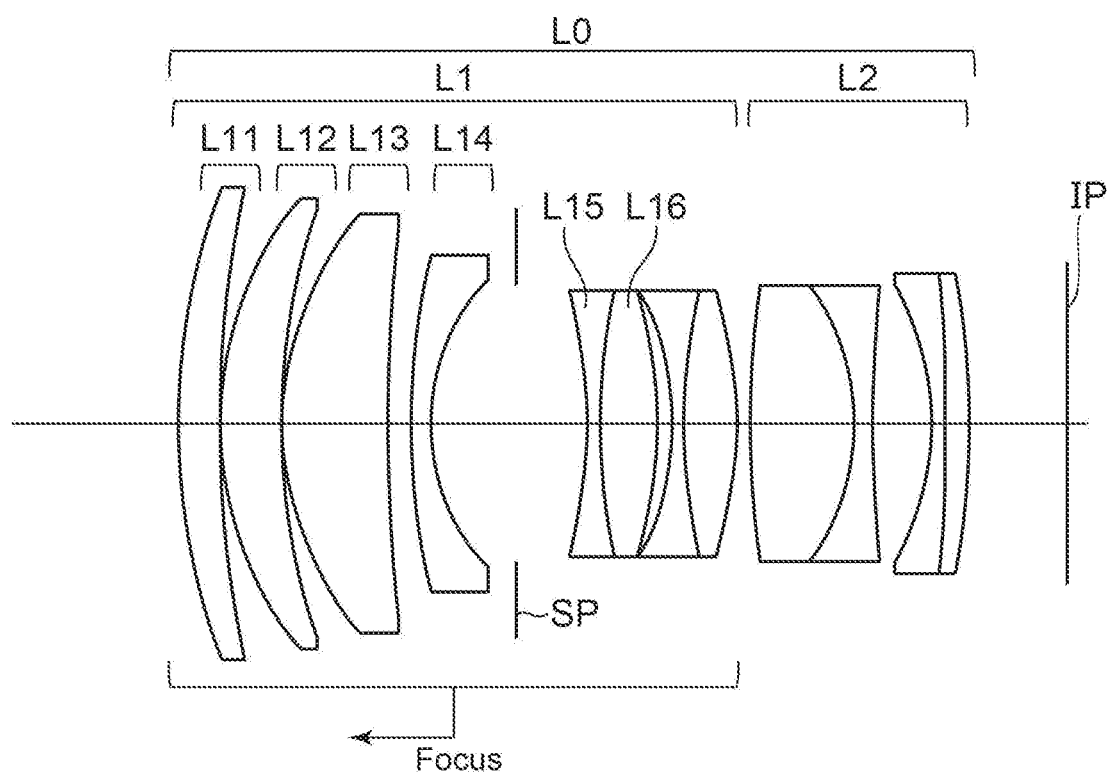
FIG. 11 is a cross-sectional view of an optical system of a sixth embodiment.
Figure 12:
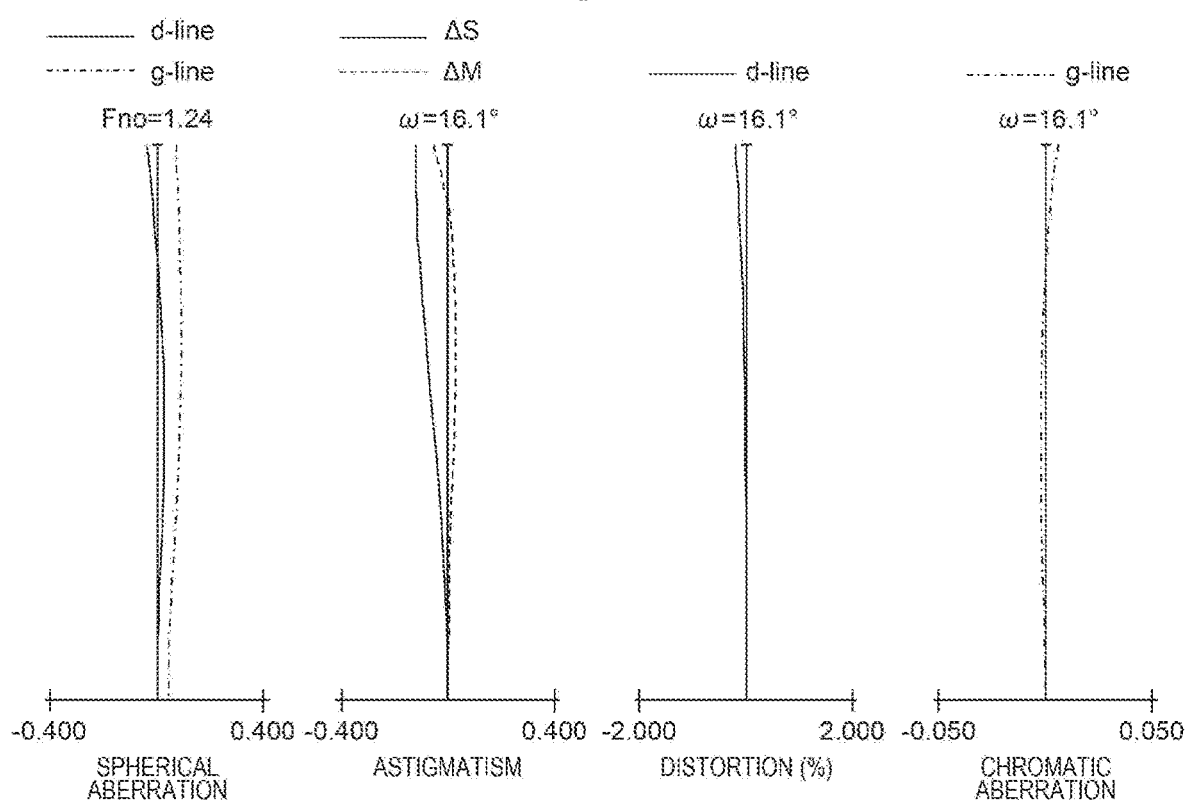
FIG. 12 is an aberration diagram of the optical system of the sixth embodiment.

Embodiments of an optical system and an imaging apparatus having the same of the present invention are described hereinafter. The optical system of each embodiment is an imaging optical system used for imaging apparatuses such as digital still cameras, digital video cameras, broadcasting cameras, silver-halide film cameras, and monitoring cameras.

FIGS. 1, 3, 5, 7, 9, and 11 are cross-sectional views of an optical system L0, which is in focus at infinity, of first to sixth embodiments, respectively. SP illustrated in the cross-sectional views is a diaphragm. IP is an image plane. When the optical system L0 of the embodiments is used as an imaging optical system of a video camera or digital camera, an image pickup device such as a CCD sensor or CMOS sensor is arranged at the image plane IP. When the optical system L0 of the embodiments is used as an imaging optical system of a silver-halide film camera, a film is arranged at the image plane IP.

In the lens cross-sectional views, the left side is the object side, and the right side is the image side. Moreover, the arrow illustrated in each lens cross-sectional view indicates the moving direction of a lens unit at the time of focusing from infinity to close range.

FIGS. 2, 4, 6, 8, 10, and 12 are aberration diagrams of the optical system L0, which is in focus at infinity, of the first to sixth embodiments, respectively. In the aberration diagrams, Fno is an f-number, and w is a half angle of view (°). In spherical aberration diagrams, d-line (a solid line) is the d-line (wavelength: 587.6 nm), and g-line (a dot-and-dash line) is the g-line (wavelength: 435.8 nm). In astigmatism diagrams, ΔS (a solid line) is a sagittal image plane at the d-line, and ΔM (a broken line) is a meridional image plane at the d-line. Distortion aberration is illustrated with respect to the d-line. Magnification chromatic aberration diagrams are illustrated with respect to the g-line.

The optical system L0 of the embodiments includes a first lens unit L1 having positive refractive power and a second lens unit L2 having positive or negative refractive power, which are arranged in the order from the object side to the image side.

In the optical system L0 of the embodiments, the first lens unit L1 includes, in the order from the object side to the image side, a positive lens L11, a positive lens L12, a positive lens L13, a negative meniscus lens L14 having a concave surface on the image plane side, the diaphragm SP, and at least one lens.

In the optical system L0 of the embodiments, the second lens unit L2 includes at least one positive lens and at least one negative lens.

Moreover, at the time of focusing from an object at infinity to a near object, the first lens unit L1 moves to the object side. The second lens unit L2 does not move at the time of focusing. In other words, at the time of focusing, the interval on the optical axis between the first lens unit L1 and the second lens unit L2 changes.

The configuration of the first lens unit L1 in the optical system of the embodiments is described. In order to reduce the size of a large aperture medium telephoto optical system, a beam that determines an f-number (an f-number beam) needs to be converged effectively in the first lens unit L1. Hence, three positive lenses are arranged on the object side of the first lens unit L1 with respect to the diaphragm SP.

If the number of positive lenses is equal to or less than two, the refractive power of each positive lens increases. As a result, it becomes difficult to preferably correct various aberrations such as spherical aberration and chromatic aberration.

Furthermore, in order to further improve image quality, it is necessary to effectively correct various aberrations by causing the refraction effect of a negative lens to work on converged light. Hence, the negative meniscus lens L14 having the concave surface on the image plane side is arranged on the object side with respect to the diaphragm SP and on the image side with respect to the three positive lenses.

The negative meniscus lens L14 having the concave surface on the image plane side is arranged in this manner to effectively correct various aberrations caused by the positive lenses. Furthermore, at least one lens is arranged on an image side of the diaphragm SP to more effectively converge the f-number beam.

Next, the configuration of the second lens unit L2 in the optical system of the embodiments is described. In the optical system L0 of the embodiments, the second lens unit L2 plays a role in correcting the various remaining aberrations that cannot be completely corrected in the first lens unit L1. The second lens unit is arranged at a position in close proximity to the image plane IP to enable effective correction of various aberrations such as field curvature. Hence, in the embodiments, the second lens unit L2 is configured in such a manner as to satisfy conditional expressions described below. Moreover, in order to preferably correct various aberrations including chromatic aberration, the second lens unit L2 is configured including at least one positive and one negative lens.

Next, the movement of the lens unit with focusing in the optical system L0 of the embodiments is described. As described above, at the time of focusing from infinity to close range in the optical system L0 of the embodiments, the first lens unit L1 is moved to the object side, and the second lens unit is immobile. Consequently, a focusing mechanism is simplified. Accordingly, a lens apparatus including the optical system L0 can be configured to be small.

The optical system L0 of the embodiments satisfies the following conditional expression:

$$1.1 < D2/BF < 2.5 \tag{1}$$

Here, D2 is the distance on the optical axis from a surface closest to the object side to a surface closest to the image side in the second lens unit L2. BF is the back focus of the optical system L0.

The conditional expression (1) is for causing the size reduction and image quality improvement of the optical system L0 to be compatible. If D2 increases to the extent that the value of D2/BF exceeds an upper limit of the conditional expression (1), the total length of the optical system L0 increases too much, and it becomes difficult to configure the optical system L0 to be small. If D2 decreases to the extent that the value of D2/BF falls below a lower limit of the conditional expression (1), it becomes difficult to appropriately arrange lenses necessary to preferably correct various aberrations in the second lens unit L2, and it becomes difficult to improve the image quality of the optical system L0.

It is preferable to set the numerical range of the conditional expression (1) as in the following conditional expression (1a):

$$1.3 < D2/BF < 2.4 \tag{1a}$$

It is more preferable to set the numerical range of the conditional expression (1) as in the following conditional expression (1b):

$$1.6 < D2/BF < 2.3 \tag{1b}$$

In the embodiments, a small high-quality imaging optical system is realized with the above configuration.

Next, a more preferable configuration in the optical system L0 of the embodiments is described. It is preferable that the optical system L0 of the embodiments satisfy one or more of the following conditional expressions (2) to (9):

$$2.8 < F11/F < 5.1 \tag{2}$$

$$1.3 < F12/F < 2.9 \tag{3}$$

$$0.8 < F13/F < 1.7 \tag{4}$$

$$0.50 < |F14|/F < 0.90 \tag{5}$$

$$1.75 < Np \tag{6}$$

$$0.32 < F2pm/F < 0.51 \tag{7}$$

$$Nn < 1.65 \tag{8}$$

$$0.45 < |F2nm|/F < 0.80 \tag{9}$$

Here, F11 is the focal length of the positive lens L11. F12 is the focal length of the positive lens L12. F13 is the focal length of the positive lens L13. F14 is the focal length of the negative lens L14. F is the focal length of the entire optical system L0. Np is the refractive index at the d-line of a positive lens having the highest refractive index among the positive lenses included in the second lens unit L2. F2pm is the focal length of a positive lens having the greatest refractive power among the positive lenses included in the second lens unit L2. Nn is the refractive index at the d-line of a negative lens having the lowest refractive index among the negative lenses included in the second lens unit L2. F2nm is the focal length of a negative lens having the greatest negative refractive power among the negative lenses included in the second lens unit L2 (a negative lens whose focal length has the lowest absolute value among the negative lenses included in the second lens unit L2).

It is assumed that a value taken when each lens included in the optical system L0 is regarded as a single lens element is used for F2pm and F2nm.

The conditional expression (2) relates to the focal length of the positive lens L11. If the focal length of the positive lens L11 increases to the extent that the value of F11/F exceeds an upper limit of the conditional expression (2), axial rays cannot be sufficiently converged in the first lens unit L1, and it becomes difficult to configure the optical system to be sufficiently small. If the focal length of the positive lens L11 decreases to the extent that the value of F11/F falls below a lower limit of the conditional expression (2), many of various aberrations such as spherical aberration and chromatic aberration occur in the positive lens L11, and it becomes difficult to sufficiently improve the image quality of the optical system L0.

The conditional expression (3) relates to the focal length of the positive lens L12. If the focal length of the positive lens L12 increases to the extent that the value of F12/F exceeds an upper limit of the conditional expression (3), axial rays cannot be sufficiently converged in the first lens unit L1, and it becomes difficult to configure the optical system to be sufficiently small. If the focal length of the positive lens L12 decreases to the extent that the value of F12/F falls below a lower limit of the conditional expression (3), many of various aberrations such as spherical aberration and chromatic aberration occur in the positive lens L12, and it becomes difficult to sufficiently improve the image quality of the optical system L0.

The conditional expression (4) relates to the focal length of the positive lens L13. If the focal length of the positive lens L13 increases to the extent that the value of F13/F exceeds an upper limit of the conditional expression (4), axial rays cannot be sufficiently converged in the first lens unit L1, and it becomes difficult to configure the optical system to be sufficiently small. If the focal length of the positive lens L13 decreases to the extent that the value of F13/F falls below a lower limit of the conditional expression (4), many of various aberrations such as spherical aberration and chromatic aberration occur in the positive lens L13, and it becomes difficult to sufficiently improve the image quality of the optical system L0.

The conditional expression (5) relates to the focal length of the negative lens L14. If the absolute value of the focal length of the negative lens L14 increases to the extent that the value of |F14|/F exceeds an upper limit of the conditional expression (5), it becomes difficult to sufficiently correct various aberrations such as spherical aberration and chromatic aberration, and it becomes difficult to sufficiently improve the image quality of the optical system L0. If the absolute value of the focal length of the negative lens L14 decreases to the extent that the value of |F14|/F falls below a lower limit of the conditional expression (5), the diverging effect of the axial rays excessively increases, which causes an increase in aperture diameter. As a result, it becomes difficult to configure the optical system L0 to be sufficiently small.

The conditional expression (6) relates to the refractive index of the positive lens included in the second lens unit L2. As described above, the second lens unit L2 plays a role in correcting the various remaining aberrations that cannot be completely corrected in the first lens unit L1. The point at which a marginal axial ray passes through each lens surface is high in the first lens unit L1; accordingly, especially spherical aberration and axial chromatic aberration occurs significantly. Hence, it is preferable that the first lens unit L1 correct these aberrations predominantly. On the other hand, when an attempt is made to correct spherical aberration and axial chromatic aberration predominantly in the first lens unit L1, field curvature cannot be sufficiently corrected in some cases. Hence, it is desired to configure the second lens unit L2 in such a manner as to be able to effectively correct field curvature in the second lens unit L2. If the value of Np falls below a lower limit of the conditional expression (6), it becomes difficult to sufficiently correct field curvature in the second lens unit L2, and it becomes difficult to sufficiently improve the image quality of the optical system L0.

The range of selection for usable lens materials reduces with increasing value of Np. Hence, as in conditional expressions (6a) and (6b) described below, it is more preferable to set an upper limit to the value of Np.

The conditional expression (7) relates to the focal length of the positive lens included in the second lens unit L2. If F2pm exceeds an upper limit of the conditional expression (7), axial rays cannot be sufficiently converged in the second lens unit L2; accordingly, the size of the optical system increases. If F2pm falls below a lower limit of the conditional expression (7), it becomes difficult to sufficiently correct field curvature, coma aberration, and the like in the second lens unit L2, and it becomes difficult to sufficiently improve the image quality of the optical system L0.

The conditional expression (8) relates to the refractive index of the negative lens included in the second lens unit. If Nn exceeds an upper limit of the conditional expression (8), it becomes impossible to sufficiently correct various aberrations such as field curvature in the second lens unit L2. As a result, it becomes difficult to sufficiently improve the image quality of the optical system L0.

The range of selection for usable lens materials reduces with decreasing value of Nn. Hence, as in conditional expressions (8a) and (8b), it is more preferable to set a lower limit to the value of Nn.

The conditional expression (9) relates to the focal length of the negative lens included in the second lens unit L2. If the absolute value of F2nm increases to the extent of exceeding an upper limit of the conditional expression (9), the second lens unit L2 cannot correct various aberrations such as coma aberration and field curvature sufficiently, and it becomes difficult to sufficiently improve the image quality of the optical system L0. If the absolute value of F2nm decreases to the extent of exceeding a lower limit of the conditional expression (9), it becomes difficult to sufficiently converge axial rays in the second lens unit L2, and it becomes difficult to sufficiently reduce the size of the optical system L0.

It is more preferable to set the numerical ranges of the conditional expressions (2) to (9) as in the following conditional expressions (2a) to (9a), respectively.

$$2.9 < F11/F < 5.0 \tag{2a}$$

$$1.4 < F12/F < 2.8 \tag{3a}$$

$$0.9 < F13/F < 1.6 \tag{4a}$$

$0.53<|F14|/F<0.86$ (5a)

$1.78<Np<2.10$ (6a)

$0.34<F2pm/F<0.49$ (7a)

$1.40<Nn<1.62$ (8a)

$0.48<|F2nm|/F<0.78$ (9a)

Moreover, it is more preferable to set the numerical ranges of the conditional expressions (2) to (9) as in the following conditional expressions (2b) to (9b), respectively.

$3.1<F11/F<4.8$ (2b)

$1.5<F12/F<2.7$ (3b)

$1.0<F13/F<1.5$ (4b)

$0.55<|F14|/F<0.84$ (5b)

$1.80<Np<2.00$ (6b)

$0.36<F2pm/F<0.47$ (7b)

$1.45<Nn<1.60$ (8b)

$0.51<|F2nm|/F<0.76$ (9b)

Moreover, in the embodiments, it is preferable that at least one lens surface of the lenses arranged on the object side with respect to the diaphragm SP in the first lens unit L1 be made aspheric. The lens on the object side with respect to the diaphragm SP is made aspheric; accordingly, it is possible to effectively correct spherical aberration, and it becomes easy to improve the image quality of the optical system L0.

Moreover, in the embodiments, it is preferable that the negative lens L15 having the concave surface on the object side be arranged adjacently on the image side of the diaphragm SP. Consequently, various aberrations such as coma aberration can be effectively corrected.

Moreover, in order to further improve the image quality of the optical system L0, it is preferable to cement the positive lens L16 having a convex surface on the image side to an image side of the negative lens L15. At this point in time, it is preferable that the cemented lens including the negative lens L15 and the positive lens L16, as a whole, have positive refractive power. The lens arranged on the image side of the diaphragm SP is configured in this manner; accordingly, it is possible to more effectively correct various aberrations such as coma aberration and field curvature, and further improve the image quality of the optical system L0.

In the cemented lens including the negative lens L15 and the positive lens L16, another optical member may be cemented between the negative lens L15 and the positive lens L16. For example, the negative lens L15 and the positive lens L16 may be cemented, sandwiching an optical element whose principal component is resin material between the negative lens L15 and the positive lens L16.

In the optical system of the embodiments, distortion aberration may be electronically corrected with application of various known methods.

In the embodiments, optical members such as a low-pass filter and an IR cut filter may be arranged between the image plane IP and the second lens unit L2.

Next, lens configurations of the embodiments are described.

First Embodiment

In the optical system L0 of a first embodiment, the focal length is 85.00 mm, and the f-number is 1.24.

The object side of the first lens unit L1 with respect to the diaphragm SP is configured including the positive meniscus lens L11 having a convex surface on the object side, the positive meniscus lens L12 having a convex surface on the object side, the positive meniscus lens L13 having a convex surface on the object side, and the negative lens L14. A surface of the negative lens L14 on the object side is aspheric.

Moreover, the image side of the first lens unit L1 with respect to the diaphragm SP is configured including two cemented lenses. The cemented lens on the object side is a cemented lens obtained by cementing the negative biconcave lens L15, a positive meniscus optical element having a convex surface on the object side, and the positive biconvex lens L16. The cemented lens on the image side is a cemented lens obtained by cementing a negative biconcave lens and a positive biconvex lens.

The second lens unit L2 is configured including a cemented lens obtained by cementing a positive biconvex lens and a negative biconcave lens, and a cemented lens obtained by cementing a negative biconcave lens and a positive biconvex lens, the cemented lenses being arranged in the order from the object side to the image side.

Second Embodiment

In the optical system L0 of a second embodiment, the focal length is 83.00 mm and the f-number is 1.24.

The object side of the first lens unit L1 with respect to the diaphragm SP is configured including the positive meniscus lens L11 having a convex surface on the object side, the positive meniscus lens L12 having a convex surface on the object side, the positive meniscus lens L13 having a convex surface on the object side, and the negative lens L14. A surface of the negative lens L14 on the object side is aspheric.

Moreover, the image side of the first lens unit L1 with respect to the diaphragm SP is configured including two cemented lenses. The cemented lens on the object side is a cemented lens obtained by cementing the negative biconcave lens L15, a positive meniscus optical element having a convex surface on the object side, and the positive biconvex lens L16. The cemented lens on the image side is a cemented lens obtained by cementing a negative biconcave lens and a positive biconvex lens.

The second lens unit L2 is configured including a cemented lens obtained by cementing a positive biconvex lens and a negative meniscus lens having a convex surface on the image side, a negative biconcave lens, and a negative meniscus lens having a convex surface on the image side, which are arranged in the order from the object side to the image side.

Third Embodiment

In the optical system L0 of a third embodiment, the focal length is 87.00 mm and the f-number is 1.24.

The object side of the first lens unit L1 with respect to the diaphragm SP is configured including the positive meniscus lens L11 having a convex surface on the object side, the positive meniscus lens L12 having a convex surface on the object side, the positive meniscus lens L13 having a convex surface on the object side, and the negative lens L14. A surface of the positive lens L11 on the object side is aspheric.

Moreover, the image side of the first lens L1 with respect to the diaphragm SP is configured including two cemented lenses. The cemented lens on the object side is a cemented lens obtained by cementing the negative biconcave lens L15, a positive meniscus optical element having a convex surface on the object side, and the positive biconvex lens L16. The cemented lens on the image side is a cemented lens obtained by cementing a negative biconcave lens and a positive biconvex lens.

The second lens unit L2 is configured including a cemented lens obtained by cementing a positive biconvex lens and a negative biconcave lens, a negative biconcave lens, and a positive biconvex lens, which are arranged in the order from the object side to the image side.

Fourth Embodiment

In the optical system L0 of a fourth embodiment, the focal length is 85.00 mm and the f-number is 1.24.

The object side of the first unit L1 with respect to the diaphragm SP is configured including the positive meniscus lens L11 having a convex surface on the object side, the positive meniscus lens L12 having a convex surface on the object side, the positive meniscus lens L13 having a convex surface on the object side, and the negative lens L14. A surface of the negative lens L14 on the object side is aspheric.

Moreover, the image side of the first lens unit L1 with respect to the diaphragm SP is configured including two cemented lenses. The cemented lens on the object side is a cemented lens obtained by cementing the negative biconcave lens L15 and the positive biconvex lens L16. The cemented lens on the image side is a cemented lens obtained by cementing a negative biconcave lens and a positive biconvex lens.

The second lens unit L2 is configured including a cemented lens obtained by cementing a positive biconvex lens and a negative biconcave lens, and a cemented lens obtained by cementing a negative biconcave lens and a positive biconvex lens, which are arranged in the order from the object side to the image side.

Fifth Embodiment

In the optical system L0 of a fifth embodiment, the focal length is 95.00 mm and the f-number is 1.26.

The object side of the first lens unit L1 with respect to the diaphragm SP is configured including the positive meniscus lens L11 having a convex surface on the object side, the positive meniscus lens L12 having a convex surface on the object side, the positive meniscus lens L13 having a convex surface on the object side, and the negative lens L14. A surface of the negative lens L14 on the object side is aspheric.

Moreover, the image side of the first lens unit L1 with respect to the diaphragm SP is configured including two cemented lenses. The cemented lens on the object side is a cemented lens obtained by cementing the negative biconcave lens L15 and the positive biconvex lens L16. The cemented lens on the image side is a cemented lens obtained by cementing a negative biconcave lens and a positive biconvex lens.

The second lens unit L2 is configured including a cemented lens obtained by cementing a positive biconvex lens and a negative biconcave lens, and a cemented lens obtained by cementing a negative biconcave lens and a positive biconvex lens, which are arranged in the order from the object side to the image side.

Sixth Embodiment

In the optical system L0 of a sixth embodiment, the focal length is 75.00 mm, and the f-number is 1.24.

The object side of the first lens unit L1 with respect to the diaphragm SP is configured including the positive meniscus lens L11 having a convex surface on the object side, the positive meniscus lens L12 having a convex surface on the object side, the positive meniscus lens L13 having a convex surface on the object side, and the negative lens L14. A surface of the negative lens L14 on the object side is aspheric.

Moreover, the image side of the first lens unit L1 with respect to the diaphragm SP is configured including two cemented lenses. The cemented lens on the object side is a cemented lens obtained by cementing the negative biconcave lens L15 and the positive biconvex lens L16. The cemented lens on the image side is a cemented lens obtained by cementing a negative biconcave lens and a positive biconvex lens.

The second lens unit L2 is configured including a cemented lens obtained by cementing a positive biconvex lens and a negative biconcave lens, and a cemented lens obtained by cementing a negative meniscus lens having a convex surface on the image side and a positive meniscus lens having a convex surface on the image side, which are arranged in the order from the object side to the image side.

Next, first to sixth numerical embodiments corresponding to the optical system L0 of the above-mentioned first to sixth embodiments are illustrated.

In surface data of each numerical embodiment, r denotes the radius of curvature of each lens surface, d (mm) denotes the interval on the axis (the distance on the optical axis) between the m-th surface and the (m+1)-th surface. However, m is a surface number numbered from the light entering side. Moreover, nd denotes the refractive index of each optical member at the d-line, and νd denotes the Abbe number of the optical member. The Abbe number νd is a value defined by the following equation (A), when setting the refractive indices at the Fraunhofer g, F, d, and C lines as ng, nF, nd, and nC, respectively.

$$\nu d = (nd-1)/(nF-nC) \qquad (A)$$

In surface data of each numerical embodiment, a * (asterisk) symbol is added after the surface number of an aspheric lens surface. Moreover, aspheric data indicates the aspheric coefficient of each aspheric surface. "e±Z" of the aspheric coefficient indicates "×10$^{\pm Z}$". The aspheric shape of a lens surface is expressed by the following equation (13) where the amount of displacement from the surface vertex in the optical axis direction is X, the height from the optical axis in a direction perpendicular to the optical axis direction is H, the paraxial radius of curvature is R, the conic constant is K, and the aspheric coefficients are A4, A6, A8, A10, and A12.

[Math. 1]

$$X = \frac{\frac{H^3}{R}}{1+\sqrt{1-(1+K)\left(\frac{H}{R}\right)^2}} + A4H^4 + A6H^6 + A8H^8 + A10H^{10} + A12H^{12} \quad (13)$$

In the numerical embodiments, the focal length (mm), the f-number, and the half angle of view (°) are values of when the optical system of each embodiment focuses at infinity. The back focus BF is the distance from a final lens surface (a lens surface closest to the image side in the second lens unit L2) to the image plane IP. The overall lens length is a value obtained by adding back focus to the distance from a first lens surface to the final lens surface.

First Numerical Embodiment

Unit mm

Surface Data

| Surface Number | r | d | nd | vd | Effective Aperture |
|---|---|---|---|---|---|
| 1 | 70.530 | 6.03 | 1.69680 | 55.5 | 68.60 |
| 2 | 99.208 | 0.30 | | | 67.28 |
| 3 | 46.657 | 12.20 | 1.49700 | 81.5 | 65.31 |
| 4 | 140.163 | 0.30 | | | 63.43 |
| 5 | 39.897 | 12.87 | 1.49700 | 81.5 | 56.03 |
| 6 | 141.407 | 0.50 | | | 51.49 |
| 7* | 75.227 | 2.50 | 1.72047 | 34.7 | 48.48 |
| 8 | 26.935 | 12.63 | | | 39.52 |
| 9 (Aperture) | ∞ | 9.33 | | | 37.00 |
| 10 | −49.201 | 1.60 | 1.66565 | 35.6 | 32.91 |
| 11 | 43.010 | 1.00 | 1.60401 | 24.2 | 32.48 |
| 12 | 56.494 | 8.29 | 1.83481 | 42.7 | 32.47 |
| 13 | −49.013 | 2.53 | | | 32.15 |
| 14 | −35.535 | 1.60 | 1.59270 | 35.3 | 30.53 |
| 15 | 100.447 | 5.64 | 1.90043 | 37.4 | 31.17 |
| 16 | −69.073 | (variable) | | | 32.35 |
| 17 | 165.335 | 12.17 | 1.80400 | 46.5 | 34.34 |
| 18 | −33.480 | 2.50 | 1.67270 | 32.1 | 35.30 |
| 19 | 254.467 | 5.57 | | | 35.88 |
| 20 | −46.175 | 2.00 | 1.48749 | 70.2 | 36.16 |
| 21 | 110.287 | 4.95 | 1.90043 | 37.4 | 39.27 |
| 22 | −167.036 | 13.31 | | | 39.75 |
| 23 (Image Plane) | ∞ | | | | |

Aspheric Data
Seventh Surface

K = 0.00000e+000  A4 = −1.58048e−006  A6 = 6.11191e−011
A8 = 2.02073e−013

Various Types of Data

| Focal Length | 85.00 |
|---|---|
| F-number | 1.24 |
| Half Angle of View (°) | 14.28 |
| Image Height | 21.64 |
| Overall Lens Length | 119.32 |
| BF | 13.31 |

| Object Distance | Infinity | 0.85 m |
|---|---|---|
| d16 | 1.50 | 16.70 |

| Position of Entrance Pupil | 72.51 |
|---|---|
| Position of Exit Pupil | −55.40 |
| Front Principal Point Position | 52.36 |
| Rear Principal Point Position | −71.69 |

Unit mm

Lens Unit Data

| Unit | Starting Surface | Focal Length | Lens Structure Length | Front Principal Point Position | Rear Principal Point Position |
|---|---|---|---|---|---|
| 1 | 1 | 98.80 | 77.32 | 25.26 | −61.01 |
| 2 | 17 | 205.33 | 27.19 | 2.96 | −15.36 |

Single Lens Element Data

| Lens | Starting Surface | Focal Length |
|---|---|---|
| 1 | 1 | 322.35 |
| 2 | 3 | 134.88 |
| 3 | 5 | 107.31 |
| 4 | 7 | −59.53 |
| 5 | 10 | −34.24 |
| 6 | 11 | 290.24 |
| 7 | 12 | 32.60 |
| 8 | 14 | −44.09 |
| 9 | 15 | 46.18 |
| 10 | 17 | 35.60 |
| 11 | 18 | −43.83 |
| 12 | 20 | −66.49 |
| 13 | 21 | 74.40 |

Second Numeral Embodiment

Unit mm

Surface Data

| Surface Number | r | d | nd | vd | Effective Aperture |
|---|---|---|---|---|---|
| 1 | 86.121 | 5.53 | 1.69680 | 55.5 | 69.23 |
| 2 | 121.753 | 0.30 | | | 67.25 |
| 3 | 49.386 | 12.60 | 1.49700 | 81.5 | 64.42 |
| 4 | 109.809 | 0.30 | | | 61.17 |
| 5 | 39.228 | 13.13 | 1.49700 | 81.5 | 55.93 |
| 6 | 219.136 | 0.50 | | | 52.72 |
| 7* | 71.446 | 2.50 | 1.72047 | 34.7 | 48.63 |
| 8 | 26.788 | 16.94 | | | 40.04 |
| 9 (Aperture) | ∞ | 9.33 | | | 36.50 |
| 10 | −66.103 | 1.60 | 1.66565 | 35.6 | 33.30 |
| 11 | 41.594 | 1.00 | 1.60401 | 24.2 | 32.98 |
| 12 | 53.417 | 10.30 | 1.83481 | 42.7 | 32.98 |
| 13 | −52.889 | 1.22 | | | 32.50 |
| 14 | −39.176 | 1.60 | 1.59270 | 35.3 | 32.26 |
| 15 | 77.248 | 9.71 | 1.90043 | 37.4 | 31.60 |
| 16 | −66.143 | (variable) | | | 33.97 |
| 17 | 128.257 | 9.81 | 1.80400 | 46.5 | 35.50 |
| 18 | −33.289 | 2.00 | 1.67270 | 32.1 | 35.65 |
| 19 | −162.603 | 0.36 | | | 35.32 |
| 20 | −484.864 | 2.00 | 1.48749 | 70.2 | 35.08 |
| 21 | 130.368 | 5.08 | | | 34.61 |
| 22 | −45.257 | 3.00 | 1.90043 | 37.4 | 34.57 |
| 23 | −166.614 | 13.50 | | | 36.45 |
| 24 (Image Plane) | ∞ | | | | |

Aspheric Data
Seventh Surface

K = 0.00000e+000  A4 = −1.91492e−006  A6 = −2.80846e−010
A8 = 1.97914e−013

Various Types of Data

| Focal Length | 83.00 |
|---|---|
| F-number | 1.24 |
| Half Angle of View (°) | 14.61 |

-continued

| Unit mm | | |
|---|---|---|
| Image Height | 21.64 | |
| Overall Lens Length | 123.80 | |
| BF | 13.50 | |
| Object Distance | Infinity | 0.85 m |
| d16 | 1.50 | 12.92 |
| Position of Entrance Pupil | 81.76 | |
| Position of Exit Pupil | −38.20 | |
| Front Principal Point Position | 31.50 | |
| Rear Principal Point Position | −69.50 | |

Lens Unit Data

| Unit | Starting Surface | Focal Length | Lens Structure Length | Front Principal Point Position | Rear Principal Point Position |
|---|---|---|---|---|---|
| 1 | 1 | 88.54 | 86.55 | 60.07 | −53.93 |
| 2 | 17 | −319.15 | 22.25 | 54.41 | 33.47 |

Single Lens Element Data

| Lens | Starting Surface | Focal Length |
|---|---|---|
| 1 | 1 | 397.02 |
| 2 | 3 | 168.89 |
| 3 | 5 | 93.87 |
| 4 | 7 | −60.91 |
| 5 | 10 | −38.13 |
| 6 | 11 | 301.53 |
| 7 | 12 | 33.30 |
| 8 | 14 | −43.63 |
| 9 | 15 | 40.88 |
| 10 | 17 | 33.79 |
| 11 | 18 | −62.61 |
| 12 | 20 | −210.54 |
| 13 | 22 | −69.82 |

Third Numerical Embodiment

| Unit mm | | | | | |
|---|---|---|---|---|---|
| Surface Data | | | | | |
| Surface Number | r | d | nd | vd | Effective Aperture |
| 1* | 123.907 | 5.80 | 1.69680 | 55.5 | 70.22 |
| 2 | 282.514 | 0.50 | | | 69.56 |
| 3 | 46.588 | 13.03 | 1.49700 | 81.5 | 67.20 |
| 4 | 142.770 | 0.50 | | | 65.36 |
| 5 | 42.000 | 14.00 | 1.49700 | 81.5 | 58.02 |
| 6 | 592.891 | 0.50 | | | 54.48 |
| 7 | 201.583 | 2.50 | 1.66565 | 35.6 | 51.23 |
| 8 | 28.485 | 13.54 | | | 40.51 |
| 9 (Aperture) | ∞ | 9.33 | | | 37.00 |
| 10 | −44.951 | 1.60 | 1.66565 | 35.6 | 32.69 |
| 11 | 38.698 | 1.00 | 1.60401 | 24.2 | 32.24 |
| 12 | 50.034 | 8.54 | 1.95375 | 32.3 | 32.24 |
| 13 | −55.045 | 1.79 | | | 31.75 |
| 14 | −42.891 | 1.60 | 1.63980 | 34.5 | 30.38 |
| 15 | 35.224 | 8.16 | 1.80400 | 46.6 | 31.66 |
| 16* | −112.457 | (variable) | | | 32.94 |
| 17 | 111.302 | 9.19 | 1.81600 | 46.6 | 34.98 |
| 18 | −44.595 | 2.00 | 1.67270 | 32.1 | 35.50 |
| 19 | 117.419 | 4.92 | | | 35.96 |
| 20 | −80.743 | 2.00 | 1.58313 | 59.4 | 36.44 |
| 21 | 79.203 | 0.85 | | | 38.88 |
| 22 | 63.004 | 6.44 | 1.88300 | 40.8 | 40.77 |
| 23 | −391.644 | 13.50 | | | 41.10 |
| 24 (Image Plane) | ∞ | | | | |

-continued

| Unit mm |
|---|

Aspheric Data

First Surface

K = 0.00000e+000 A4 = −1.09691e−007 A6 = −4.75026e−011
A8 = 1.80169e−014 A10 = −1.39805e−017

16th Surface

K = 0.00000e+000 A4 = 2.05426e−006 A6 = −3.50634e−009
A8 = 2.50733e−011 A10 = −7.38892e−014 A12 = 8.38707e−017

Various Types of Data

| Focal Length | 87.00 | |
|---|---|---|
| F-number | 1.24 | |
| Half Angle of View (°) | 13.96 | |
| Image Height | 21.64 | |
| Overall Lens Length | 122.80 | |
| BF | 13.50 | |
| Object Distance | Infinity | 0.85 m |
| d16 | 1.50 | 19.16 |
| Position of Entrance Pupil | 79.55 | |
| Position of Exit Pupil | −57.56 | |
| Front Principal Point Position | 60.04 | |
| Rear Principal Point Position | −73.50 | |

Lens Unit Data

| Unit | Starting Surface | Focal Length | Lens Structure Length | Front Principal Point Position | Rear Principal Point Position |
|---|---|---|---|---|---|
| 1 | 1 | 104.82 | 82.40 | 17.27 | −67.06 |
| 2 | 17 | 150.54 | 25.40 | 5.44 | −12.09 |

Single Lens Element Data

| Lens | Starting Surface | Focal Length |
|---|---|---|
| 1 | 1 | 312.05 |
| 2 | 3 | 133.15 |
| 3 | 5 | 90.19 |
| 4 | 7 | −50.12 |
| 5 | 10 | −31.00 |
| 6 | 11 | 273.69 |
| 7 | 12 | 28.62 |
| 8 | 14 | −29.99 |
| 9 | 15 | 34.20 |
| 10 | 17 | 40.08 |
| 11 | 18 | −47.81 |
| 12 | 20 | −68.25 |
| 13 | 22 | 61.87 |

Fourth Numerical Embodiment

| Unit mm | | | | | |
|---|---|---|---|---|---|
| Surface Data | | | | | |
| Surface Number | r | d | nd | vd | Effective Aperture |
| 1 | 88.805 | 6.04 | 1.69680 | 55.5 | 68.60 |
| 2 | 150.000 | 0.30 | | | 67.59 |
| 3 | 48.997 | 10.59 | 1.49700 | 81.5 | 65.35 |
| 4 | 112.314 | 0.30 | | | 63.46 |
| 5 | 44.793 | 14.92 | 1.49700 | 81.5 | 58.42 |
| 6 | 178.340 | 0.50 | | | 52.12 |
| 7* | 78.439 | 4.67 | 1.72047 | 34.7 | 48.93 |
| 8 | 27.087 | 12.25 | | | 38.93 |
| 9 (Aperture) | ∞ | 9.33 | | | 37.00 |

-continued

Unit mm

| | | | | | |
|---|---|---|---|---|---|
| 10 | −64.767 | 1.60 | 1.66565 | 35.6 | 33.56 |
| 11 | 90.627 | 8.98 | 1.83481 | 42.7 | 33.25 |
| 12 | −61.973 | 2.16 | | | 32.79 |
| 13 | −34.695 | 1.60 | 1.59270 | 35.3 | 32.58 |
| 14 | 103.606 | 6.42 | 1.90043 | 37.4 | 32.76 |
| 15 | −52.401 | (variable) | | | 32.68 |
| 16 | 143.075 | 13.75 | 1.80400 | 46.5 | 34.94 |
| 17 | −36.574 | 2.50 | 1.67270 | 32.1 | 35.80 |
| 18 | 213.011 | 7.26 | | | 36.02 |
| 19 | −46.532 | 2.00 | 1.48749 | 70.2 | 36.47 |
| 20 | 934.103 | 3.70 | 1.90043 | 37.4 | 38.73 |
| 21 | −129.514 | 13.00 | | | 39.31 |
| 22 (Image Plane) | ∞ | | | | |

Aspheric Data
Seventh Surface

K = 0.00000e+000 A4 = −1.32313e−006 A6 = −3.85588e−011
A8 = 1.21051e−013

Various Types of Data

| | |
|---|---|
| Focal Length | 85.00 |
| F-number | 1.24 |
| Half Angle of View (°) | 14.28 |
| Image Height | 21.64 |
| Overall Lens Length | 123.80 |
| BF | 13.00 |

| Object Distance | Infinity | 0.85 m |
|---|---|---|
| d15 | 1.93 | 16.72 |

| | |
|---|---|
| Position of Entrance Pupil | 74.69 |
| Position of Exit Pupil | −54.92 |
| Front Principal Point Position | 53.31 |
| Rear Principal Point Position | −72.00 |

Lens Unit Data

| Unit | Starting Surface | Focal Length | Lens Structure Length | Front Principal Point Position | Rear Principal Point Position |
|---|---|---|---|---|---|
| 1 | 1 | 98.17 | 79.66 | 38.30 | −57.54 |
| 2 | 16 | 296.17 | 29.21 | −7.18 | −26.72 |

Single Lens Element Data

| Lens | Starting Surface | Focal Length |
|---|---|---|
| 1 | 1 | 300.24 |
| 2 | 3 | 165.68 |
| 3 | 5 | 116.05 |
| 4 | 7 | −59.70 |
| 5 | 10 | −56.51 |
| 6 | 11 | 45.30 |
| 7 | 13 | −43.66 |
| 8 | 14 | 39.42 |
| 9 | 16 | 37.51 |
| 10 | 17 | −46.22 |
| 11 | 19 | −90.86 |
| 12 | 20 | 126.53 |

Fifth Numerical Embodiment

Unit mm

Surface Data

| Surface Number | r | d | nd | vd | Effective Aperture |
|---|---|---|---|---|---|
| 1 | 89.548 | 8.89 | 1.69680 | 55.5 | 76.67 |
| 2 | 150.000 | 0.30 | | | 74.78 |
| 3 | 56.578 | 14.91 | 1.49700 | 81.5 | 72.31 |

-continued

Unit mm

| | | | | | |
|---|---|---|---|---|---|
| 4 | 243.034 | 0.30 | | | 69.28 |
| 5 | 49.543 | 13.26 | 1.49700 | 81.5 | 61.42 |
| 6 | 153.368 | 0.50 | | | 55.63 |
| 7* | 113.690 | 10.00 | 1.72047 | 34.7 | 54.13 |
| 8 | 28.623 | 11.65 | | | 38.96 |
| 9 (Aperture) | ∞ | 9.33 | | | 36.76 |
| 10 | −66.946 | 3.00 | 1.66565 | 35.6 | 32.74 |
| 11 | 82.011 | 10.14 | 1.83481 | 42.7 | 32.03 |
| 12 | −67.090 | 1.88 | | | 31.14 |
| 13 | −36.739 | 2.00 | 1.59270 | 35.3 | 30.92 |
| 14 | 91.601 | 7.47 | 1.90043 | 37.4 | 32.80 |
| 15 | −60.606 | (variable) | | | 34.54 |
| 16 | 129.962 | 10.12 | 1.80400 | 46.5 | 36.78 |
| 17 | −34.529 | 2.50 | 1.67270 | 32.1 | 37.11 |
| 18 | 249.829 | 5.85 | | | 37.17 |
| 19 | −40.287 | 4.00 | 1.48749 | 70.2 | 37.23 |
| 20 | 591.791 | 7.21 | 1.90043 | 37.4 | 40.85 |
| 21 | −78.638 | 13.00 | | | 42.04 |
| 22 (Image Plane) | ∞ | | | | |

Aspheric Data
Seventh Surface

K = 0.00000e+000 A4 = −6.69904e−007 A6 = 1.03850e−010
A8 = 1.67742e−014

Various Types of Data

| | |
|---|---|
| Focal Length | 95.00 |
| F-number | 1.26 |
| Half Angle of View (°) | 12.83 |
| Image Height | 21.64 |
| Overall Lens Length | 137.80 |
| BF | 13.00 |

| Object Distance | Infinity | 0.85 m |
|---|---|---|
| d15 | 1.50 | 22.92 |

| | |
|---|---|
| Position of Entrance Pupil | 96.46 |
| Position of Exit Pupil | −82.91 |
| Front Principal Point Position | 97.36 |
| Rear Principal point Position | −82.00 |

Lens Unit Data

| Unit | Starting Surface | Focal Length | Lens Structure Length | Front Principal Point Position | Rear Principal Point Position |
|---|---|---|---|---|---|
| 1 | 1 | 114.37 | 93.62 | 34.22 | −74.13 |
| 2 | 16 | 131.69 | 29.68 | 11.89 | −9.30 |

Single Lens Element Data

| Lens | Starting Surface | Focal Length |
|---|---|---|
| 1 | 1 | 300.73 |
| 2 | 3 | 144.54 |
| 3 | 5 | 141.26 |
| 4 | 7 | −55.85 |
| 5 | 10 | −54.93 |
| 6 | 11 | 45.62 |
| 7 | 13 | −43.99 |
| 8 | 14 | 41.47 |
| 9 | 16 | 34.89 |
| 10 | 17 | −44.94 |
| 11 | 19 | −77.21 |
| 12 | 20 | 77.48 |

Sixth Numerical Embodiment

Unit mm

Surface Data

| Surface Number | r | d | nd | vd | Effective Aperture |
|---|---|---|---|---|---|
| 1 | 88.579 | 5.34 | 1.69680 | 55.5 | 60.53 |
| 2 | 150.000 | 0.30 | | | 59.65 |
| 3 | 48.429 | 7.61 | 1.49700 | 81.5 | 58.13 |
| 4 | 89.659 | 0.30 | | | 56.61 |
| 5 | 44.116 | 13.84 | 1.49700 | 81.5 | 53.78 |
| 6 | 228.633 | 2.69 | | | 48.57 |
| 7* | 76.551 | 2.50 | 1.72047 | 34.7 | 43.40 |
| 8 | 27.773 | 11.17 | | | 37.26 |
| 9 (Aperture) | ∞ | 9.33 | | | 36.00 |
| 10 | −71.359 | 1.60 | 1.66565 | 35.6 | 33.70 |
| 11 | 73.422 | 7.70 | 1.83481 | 42.7 | 33.76 |
| 12 | −57.245 | 1.84 | | | 33.65 |
| 13 | −36.432 | 1.60 | 1.59270 | 35.3 | 33.46 |
| 14 | 88.515 | 6.90 | 1.90043 | 37.4 | 33.73 |
| 15 | −52.307 | (variable) | | | 33.64 |
| 16 | 138.539 | 13.58 | 1.80400 | 46.5 | 34.11 |
| 17 | −31.345 | 2.50 | 1.67270 | 32.1 | 34.73 |
| 18 | 200.147 | 7.46 | | | 34.64 |
| 19 | −37.384 | 2.00 | 1.48749 | 70.2 | 34.88 |
| 20 | −264.397 | 3.00 | 1.90043 | 37.4 | 37.15 |
| 21 | −120.389 | 13.00 | | | 37.89 |
| 22 (Image Plane) | ∞ | | | | |

Aspheric Data
Seventh Surface

K = 0.00000e+000  A4 = −2.22400e−006  A6 = −1.46774e−010
A8 = 5.18253e−014

Various Types of Data

| | |
|---|---|
| Focal Length | 75.00 |
| F-number | 1.24 |
| Half Angle of View (°) | 16.09 |
| Image Height | 21.64 |

-continued

Unit mm

| | |
|---|---|
| Overall Lens Length | 115.75 |
| BF | 13.00 |

| Object Distance | Infinity | 0.85 m |
|---|---|---|
| d15 | 1.50 | 11.51 |

| | |
|---|---|
| Position of Entrance Pupil | 61.56 |
| Position of Exit Pupil | −46.07 |
| Front Principal Point Position | 41.33 |
| Rear Principal Point Position | −62.00 |

Lens Unit Data

| Unit | Starting Surface | Focal Length | Lens Structure Length | Front Principal Point Position | Rear Principal Point Position |
|---|---|---|---|---|---|
| 1 | 1 | 83.00 | 72.71 | 46.80 | −43.66 |
| 2 | 16 | 2466.71 | 28.53 | −225.16 | −224.66 |

Single Lens Element Data

| Lens | Starting Surface | Focal Length |
|---|---|---|
| 1 | 1 | 299.76 |
| 2 | 3 | 199.67 |
| 3 | 5 | 107.31 |
| 4 | 7 | −61.82 |
| 5 | 10 | −54.13 |
| 6 | 11 | 39.59 |
| 7 | 13 | −43.34 |
| 8 | 14 | 37.38 |
| 9 | 16 | 32.97 |
| 10 | 17 | −40.11 |
| 11 | 19 | −89.57 |
| 12 | 20 | 243.07 |

Various numerical values in the numerical embodiments are summarized in table 1.

TABLE 1

| | Conditional Expression (1) | Conditional Expression (2) | Conditional Expression (3) | Conditional Expression (4) | Conditional Expression (5) | Conditional Expression (6) | Conditional Expression (7) | Conditional Expression (8) | Conditional Expression (9) |
|---|---|---|---|---|---|---|---|---|---|
| First Embodiment | 2.04 | 3.79 | 1.59 | 1.26 | 0.70 | 1.90 | 0.42 | 1.49 | 0.52 |
| Second Embodiment | 1.65 | 4.78 | 2.03 | 1.13 | 0.73 | 1.80 | 0.41 | 1.49 | 0.75 |
| Third Embodiment | 1.88 | 3.59 | 1.53 | 1.04 | 0.58 | 1.88 | 0.46 | 1.58 | 0.55 |
| Fourth Embodiment | 2.25 | 3.53 | 1.95 | 1.37 | 0.70 | 1.90 | 0.44 | 1.49 | 0.54 |
| Fifth Embodiment | 2.28 | 3.17 | 1.52 | 1.49 | 0.59 | 1.90 | 0.37 | 1.49 | 0.47 |
| Sixth Embodiment | 2.19 | 4.00 | 2.66 | 1.43 | 0.82 | 1.90 | 0.44 | 1.49 | 0.53 |

[Imaging Apparatus]

Figure 13:
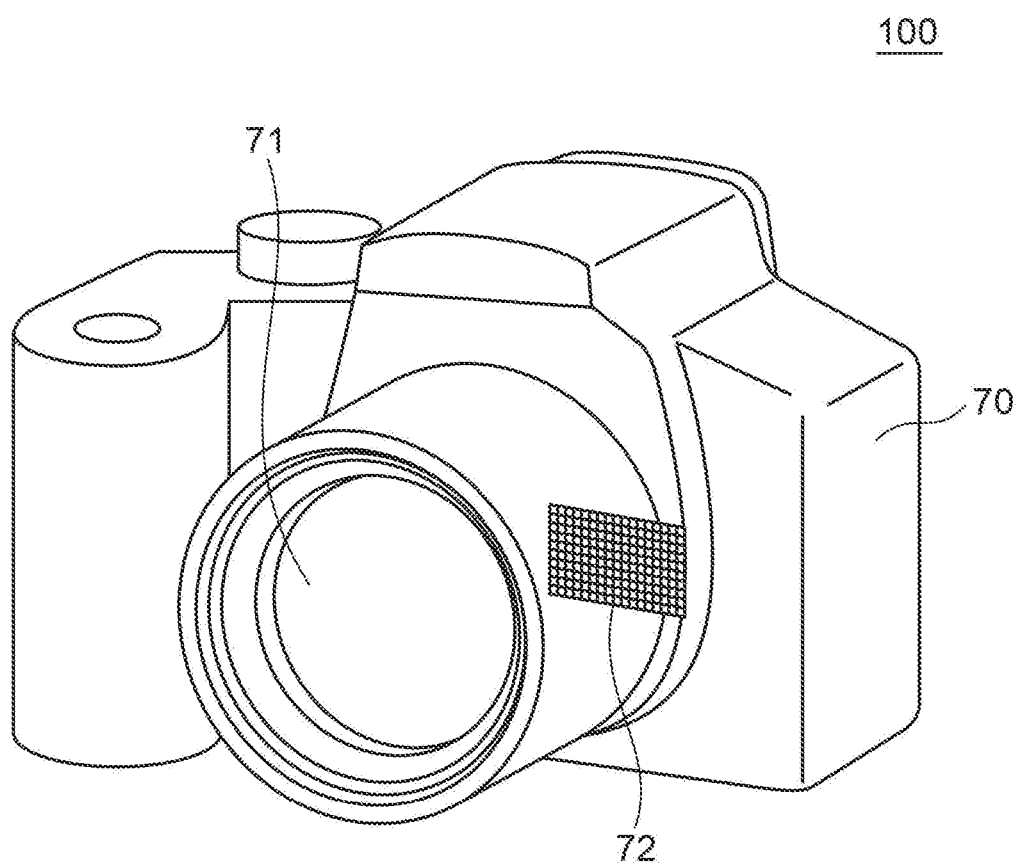
FIG. 13 is a schematic diagram of an imaging apparatus.

FIG. 13 is a schematic diagram of an imaging apparatus (digital still camera) 100 as one embodiment of the present invention. The imaging apparatus 100 of the embodiment includes a camera body 70, an optical system 71 similar to the optical system according to any of the above-mentioned first to sixth embodiments, and an image pickup device 72 that photoelectrically converts an image formed by the optical system 71. An image pickup device such as a CCD sensor or CMOS sensor can be used as the image pickup device 72.

The imaging apparatus 100 of the embodiment includes the optical system 71 similar to the optical system according to any of the first to sixth embodiments. Accordingly, although being small, the imaging apparatus 100 of the embodiment can obtain a high-quality image.

The optical system of the above-mentioned embodiments can be applied, not limited to the digital still camera illustrated in FIG. 13, but to various optical apparatuses such as a silver-halide film camera, a video camera, and a telescope.

Up to this point the preferred embodiments and examples of the present invention have been described. However, the present invention is not limited to these embodiments and examples. Various combinations, modifications, and changes can be made within the scope of the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-035315, filed Feb. 28, 2018, which is hereby incorporated by reference herein in its entirety.

What is claimed is:

1. An optical system comprising:
a first lens unit and a second lens unit arranged in order from an object side to an image side, the first lens unit having a positive refractive power, wherein
the first lens unit includes a positive lens L11, a positive lens L12, a positive lens L13, a negative meniscus lens L14 having a concave surface on the image side, a diaphragm, and at least one lens, in order from the object side to the image side,
the second lens unit includes a positive lens and a negative lens,
upon focusing from infinity to close range, the first lens unit moves to the object side to change a distance on an optical axis between the first lens unit and the second lens unit, and
the following conditional expression is satisfied:

$$1.1 < D2/BF < 2.5,$$

where D2 is a distance on the optical axis from a surface closest to the object side to a surface closest to the image side in the second lens unit, and BF is back focus of the optical system.

2. The optical system according to claim 1, wherein the following conditional expression is satisfied:

$$2.8 < F11/F < 5.1$$

where F11 is a focal length of the positive lens L11, and F is a focal length of the optical system.

3. The optical system according to claim 1, wherein the following conditional expression is satisfied:

$$1.3 < F12/F < 2.9$$

where F12 is a focal length of the positive lens L12, and F is a focal length of the optical system.

4. The optical system according to claim 1, wherein the following conditional expression is satisfied:

$$0.8 < F13/F < 1.7$$

where F13 is a focal length of the positive lens L13, and F is a focal length of the optical system.

5. The optical system according to claim 1, wherein the following conditional expression is satisfied:

$$0.50 < |F14|/F < 0.90$$

where F14 is a focal length of the negative lens L14, and F is a focal length of the optical system.

6. The optical system according to claim 1, wherein the following conditional expression is satisfied:

$$1.75 < Np$$

where Np is a refractive index of a positive lens having a highest refractive index among the positive lenses included in the second lens unit.

7. The optical system according to claim 1, wherein the following conditional expression is satisfied:

$$0.32 < F2pm/F < 0.51$$

where F2pm is a focal length of a positive lens having a highest refractive power among the positive lenses included in the second lens unit.

8. The optical system according to claim 1, wherein the following conditional expression is satisfied:

$$Nn < 1.65$$

where Nn is a refractive index of a negative lens having a lowest refractive index among the negative lenses included in the second lens unit.

9. The optical system according to claim 1, wherein the following conditional expression is satisfied:

$$0.45 < |F2nm|/F < 0.80$$

where F2nm is a focal length of a negative lens having a highest negative refractive power among the negative lenses included in the second lens unit.

10. The optical system according to claim 1, wherein the first lens unit includes an aspheric lens surface on the object side with respect to the diaphragm.

11. The optical system according to claim 1, wherein the first lens unit includes a negative lens L15 adjacent to an image side of the diaphragm, the negative lens L15 having a concave surface on the object side.

12. The optical system according to claim 11, wherein the first lens unit includes a positive lens L16 cemented to an image side of the negative lens L15, the positive lens L16 having a convex surface on the image side, and
a first cemented lens including the negative lens L15 and the positive lens L16, as a whole, has positive refractive power.

13. The optical system according to claim 12, wherein the first lens unit includes a second cemented lens obtained by cementing a negative lens and a positive lens, on an image side of the cemented lens.

14. The optical system according to claim 1, wherein the following conditional expression is satisfied:

$$1.5 < D2/BF < 2.4.$$

15. An imaging apparatus comprising:
an optical system; and
an image pickup device configured to receive light of an image formed by the optical system, wherein
the optical system includes a first lens unit and a second lens unit arranged in order from an object side to an image side, the first lens unit having a positive refractive power,
the first lens unit includes a positive lens L11, a positive lens L12, a positive lens L13, a negative meniscus lens L14 having a concave surface on the image side, a diaphragm, and at least one lens, in order from the object side to the image side, the second lens unit includes a positive lens and a negative lens, upon focusing from infinity to close range, the first lens unit moves to the object side to change a distance on an optical axis between the first lens unit and the second lens unit, and the following conditional expression is satisfied:

$$1.1 < D2/BF < 2.5$$

where D2 is a distance on the optical axis from a surface closest to the object side to a surface closest to the image side in the second lens unit, and BF is back focus of the optical system.

* * * * *